United States Patent [19]
Grosselin

[11] Patent Number: 5,769,349
[45] Date of Patent: Jun. 23, 1998

[54] DEVICE FOR AUTOMATICALLY RETRACTING A CONNECTION MEMBER WITH A RELEASABLE OR SEPARABLE ELEMENT

[75] Inventor: Daniel Grosselin, Roissy en Brie, France

[73] Assignee: R. Alkan & Cie, France

[21] Appl. No.: 640,427

[22] Filed: Apr. 30, 1996

Related U.S. Application Data

[63] Continuation of Ser. No. 133,425, Oct. 8, 1993, abandoned.

[30] Foreign Application Priority Data

Oct. 13, 1992 [FR] France .................................. 92 12241

[51] Int. Cl.⁶ ........................... B65H 75/30; B65H 75/48
[52] U.S. Cl. .................................... 242/385.1; 242/385.3
[58] Field of Search ........................... 242/385.1, 385.2, 242/385.3, 382.4

*Primary Examiner*—John Q. Nguyen
*Attorney, Agent, or Firm*—William A. Drucker

[57] ABSTRACT

The cable (2), at one extremity of which the connector is fixed, is wound onto the largest portion of the periphery of the drum (6) and is fixed at its other extremity to an arm (12) pivoting around the spin axis (7) of the drum (6). The spring returning the drum (6) clockwise is stronger than the one returning the arm (12) in the same direction. The pivoting arm (12) is housed in a cell (11) of the drum (6) and bears an articulated angle lever (17) whose extremity (18) is engaged in a notch (22) of the drum (6). A continuous traction ensures the full withdrawing of the cable, the drum then being kept in the corresponding "reinforced" position by the ratchet (24). At the time of disconnection, a new slight traction applied to the cable provokes the automatic disengagement of the ratchet (24) and the effective lowering of the cable (2).

9 Claims, 4 Drawing Sheets

DEVICE FOR AUTOMATICALLY RETRACTING A CONNECTION MEMBER WITH A RELEASABLE OR SEPARABLE ELEMENT

This application is a continuation of application Ser. No. 08/133,425, filed Oct. 8, 1993, abandoned.

FIELD OF THE INVENTION

The present invention concerns a device for the automatic retraction of a connection member having a separable element, especially a connector electrically connecting to the aircraft a load borne under the pylon of a military aircraft.

BACKGROUND OF THE INVENTION

In fact, it is known that the loads borne under the pylons of military aircraft are electrically connected to the aircraft by a connector which is manually connected during the operation for hooking the load.

The load is flight releasable and the connector is automatically disconnected at the end of a slight releasing travel via the traction of a cable secured to it. After separation, the connector needs to be retracted into the pylon of the aircraft by means of the same cable for reasons of radar furtiveness and so that it is not damaged during the return flight.

So as to meet current requirements, the cable retraction device, in addition to its main function for automatically retracting the connector as described above, needs to have the following characteristics :

a) as regards the operation for connecting the connector to the load, the operator needs to be able to pull on the cable, remove with a travel approximating the maximum travel and arrive at a "reinforced" position where the cable does not undergo any retraction effect. The operator does not need to be able to find another position, even if the first traction applied to the cable is excessively strong ;

b) during the carriage flight, the cable must not be drawn on the connector, even slightly, and needs to have a certain amount of slack as the small movements due to vibrations could possibly result in disconnection;

c) the retraction needs to be obtained, even if the resistant disconnecting force of the connector is slight (which does not apply, for example, with a small connector comprising only 19 pins) and this lowering needs to be effective so as to overcome the aerodynamic and friction forces.

Currently known retraction devices do not possess all these characteristics.

The French patent No 2,572,490 of the same Applicant describes a device for retracting an electric connector in which the cable linked to the connector is secured to the drum of a winch, said drum being subjected to a return spring and being retained by a ratchet acting on a set of ratchet wheels whose pitch is determined according to the characteristics of the connector. At the end of unwinding the cable, a ramp borne by the drum removes the ratchet which normally cooperates with the ratchet wheels so as to enable the cable be completely brought back, whereas at a return end of travel, the impact of a return stop on the ratchet replaces said catch in an active position.

This known device does not possess the characteristic a) referred to above since a traction on the cable corresponding to a virtually maximum travel is unable to place the device in a reinforced position and cannot satisfy the characteristic b) and thus provide the cable with the desired slackness.

There also exist retraction devices including a piston connected to the connector which is brought back to a retracted position by a spring having a significant force to ensure effective retraction. A bolt ensures immobilization in a reinforced position, whereas an additional traction applied to the piston cancels locking and allows for return to a retracted position. This known device does not satisfy the characteristic c) referred to above as, having regard to the force of the spring, a slight force resisting disconnection of the connector being insufficient to order retraction.

SUMMARY OF THE INVENTION

The object of the present invention is to overcome said drawbacks of known retraction devices and to this effect provides an automatic retraction device which is easy to produce and use and which in particular allows for:

during the operation for withdrawing the mobile member from the device, reaching a single "reinforced" position in which no retraction force is exerted, even if the outgoing travel is close to the maximum travel, when the mobile member is in the "reinforced" position where the latter then exhibits a certain slackness so as to avoid the accidental application of a traction due to vibrations, for example, obtaining the triggering of the retraction action, even when the mobile member of the device in a reinforced position is only subjected to a slight control force.

According to the invention, the automatic retraction device includes a first mobile element connected by a cable to the connection member and brought back by a high stiffness spring into a retracted position, and a stoppage device which, subsequent to a first traction applied to the cable, immobilizes said first mobile element in an outgoing reinforced position of the cable enabling said connection member to be connected without any retraction force being exerted on it, and it is characterized by a second mobile element to which said cable is fixed and which exhibits a limited clearance with respect to the first mobile element, a spring with slight stiffness acting on the second mobile element so as to bring back the second mobile element into a retracted position where it engages the first mobile element, said stoppage device under the effect of a second traction applied to the cable acting on said stoppage device so as to free said first mobile element which returns to its retracted position under the action of the spring with high stiffness.

Advantageously, the first mobile element is constituted by a drum turning around a spindle and the second mobile element consists of an articulated arm pivoting around said spindle and moving into a radial hollow part of said drum, the stoppage device being constituted by a ratchet engaging a projection of the drum so as to immobilize the latter in a reinforced position, whereas a thrustor joined to the pivoting lever selectively acts on said ratchet when the second traction is applied to the cable so as to free the drum and enable the latter to return into its position ensuring retraction of the cable.

Thus, it can be readily understood that, after a first traction exerted on the cable, the drum and the pivoting arm rotate jointly in a direction ensuring the maximum withdrawal of the cable, the drum being immobilized in this position by the ratchet, whereas under the action of its spring, the pivoting arm takes up its retracted position inside the drum, thus providing the cable with slackness. When a second traction is applied to the cable when extending the load, the resultant rotation of the pivoting arm (against the action of its slight return spring) provokes the freeing of the ratchet and the return to a retracted position of the unit formed by the drum and the pivoting arm under the action of the strong return spring. Thus, even if at the time of releasing, the force for disconnecting the connector is less considerable and thus the traction force applied to the cable is slight, it shall be sufficient to overcome the recall force of the pivoting arm and order unlocking, whereas the retraction force due to the strong return spring shall be considerable.

BRIEF DESCRIPTION OF THE DRAWINGS

So as to clearly understand the device of the invention, there now follows a non-restrictive example of a preferred embodiment with reference to the accompanying drawing on which.

DETAILED DESCRIPTION OF THE PREFERRED EMBODIMENTS

Figure 1:
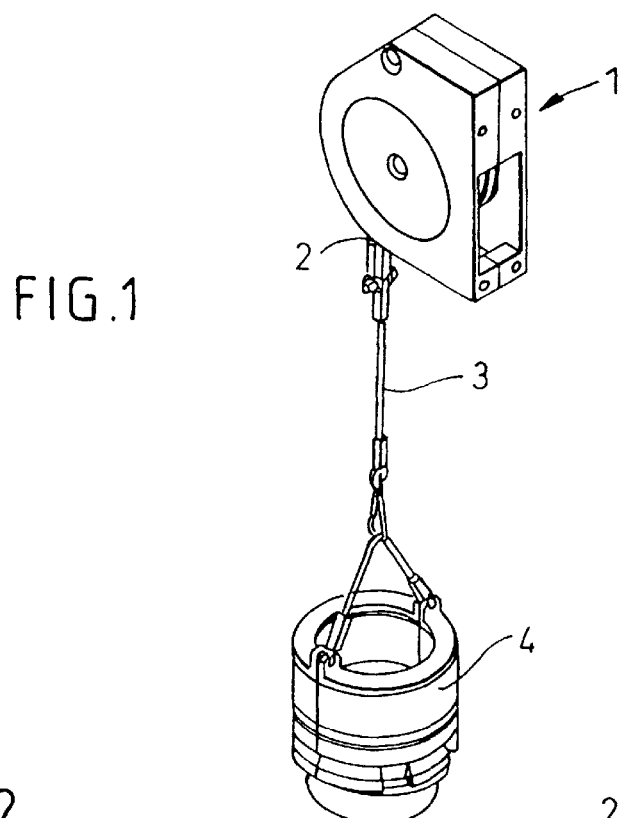
FIG. 1 is a perspective view of a retraction device according to the invention and connected to an electric connector able in particular to be used in aeronautical applications.
Figure 2:
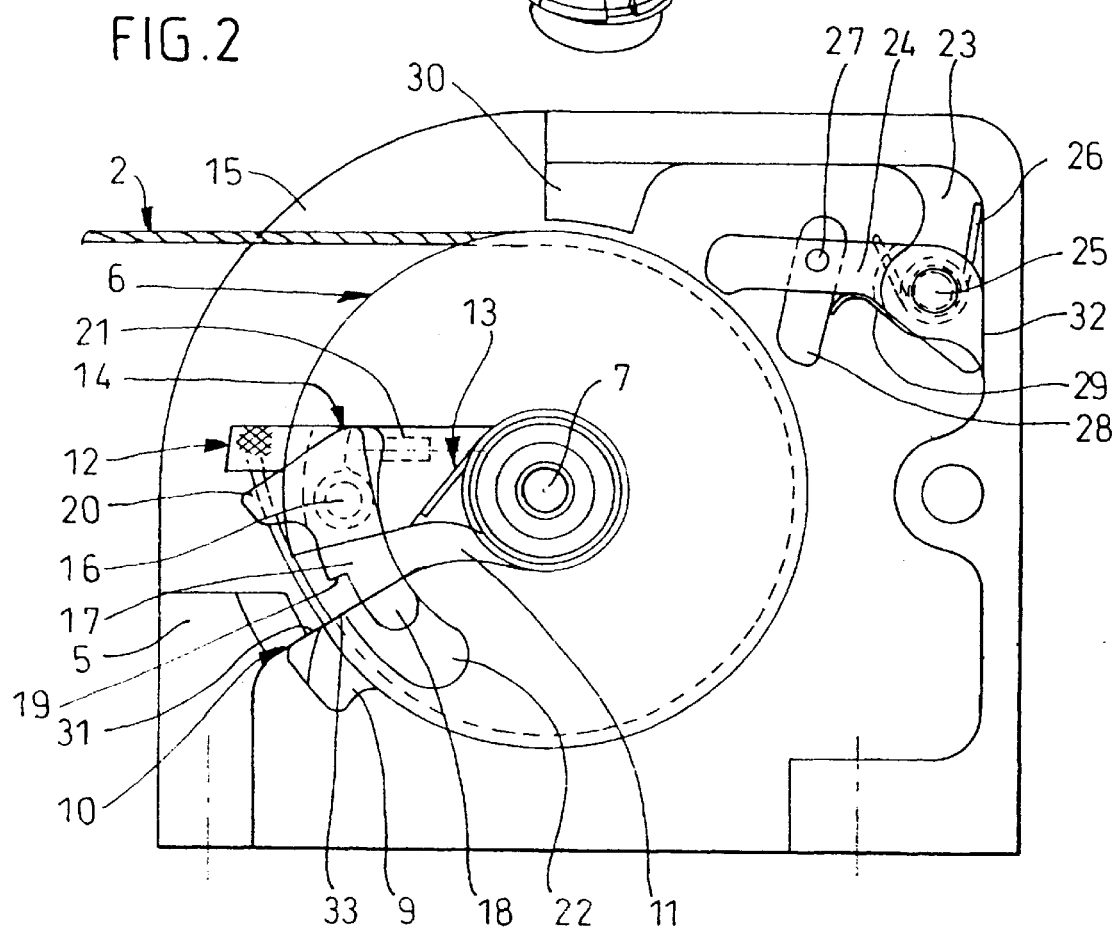
FIGS. 2 to 7 are side views of the inside of the device of FIG. 1 and shown in the successive positions of its operating cycle.

With reference to FIG. 1, shown generally at 1 is a retracting device to be secured to the carrying system of a military aircraft (not shown). A cable 2 comes out of the device 1 and is connected via a sling 3 to a known type of an electric connecting element 4 and which shall not be described in detail. The connecting element 4 is intended to engage an additional connecting element (not shown) connected to a load suspended from the carrying system so that the traction effect due to the releasing of the load automatically separates the two connecting elements.

With reference to FIGS. 2 to 8, shown at 5 is the box or casing of the retraction device 1 inside which a drum 6 is able to rotate around a spin axis 7. An extremely stiff first spring 8 (see FIG. 8) is activated to bring back the drum 6 in a clockwise direction as far as a limit position represented on FIG. 2, where a first projection consisting of a front part of a projecting portion 9 of the drum 6 abuts against a radial hollow part 11 inside which a pivoting arm or lever 12 is able to move, also rotary-mounted around the spin axis 7 and brought back in a clockwise direction by a less stiff torsion spring or second spring 13 until it comes to stop against a boss or first stop 10 of the box 5. The drum 6 has 11 inside which a radial hollow part the pivoting arm 12 is able to move, said arm also being mounted in rotation around the spin axis 7 and brought back clockwise by said less stiff torsion spring 13 until it abuts against a boss 14 of the drum 6 (position on FIG. 2). Fixed to the outer extremity of the pivoting arm 12 is one extremity of the cable 2 which is wound anticlockwise on the drum 6 over less the entire circumference of the latter and comes out via an opening 15 of the box 5 so as to link it to the connector 4.

Joined to the pivoting arm 12 around a spindle 16 is an angle lever or holding member 17 having at one extremity a tapered portion or first branch 18 continuing by a nose 19, and towards the outside a boss or second branch 20. A spring 21 acts on the angle lever 17 so as to return it anticlockwise.

The radial hollow part 11 of the drum 6 continues by an arch-shaped notch 22 for receiving the tapered portion 18 of the angle lever 17.

Joined to a lower portion 23 of the box 5 at a position almost diametrical with respect to the boss 10 is a main ratchet 24 around a spindle 25, said ratchet 24 being brought back in an anticlockwise direction by a third spring 26. Joined to the main ratchet 24 around a spindle 27 is a secondary ratchet 28 pressed in a clockwise direction by a spring 29 as far as a stop position shown on FIG. 2. Beyond the support portion 23 of the main ratchet 24, there is a boss or second stop 30 inside the box 5.

The functioning of the device is as follows. With the device in the retracted position shown on FIG. 2, in other words when the drum is brought back under the action of the spring 8 so that the first projection of its projecting portion 9 engages the boss 10 of the box 5 and the pivoting arm 12 is brought back by the spring 13 to abut against the boss 14 of the drum 6, a first traction is effected on the cable 2.

Figure 3:
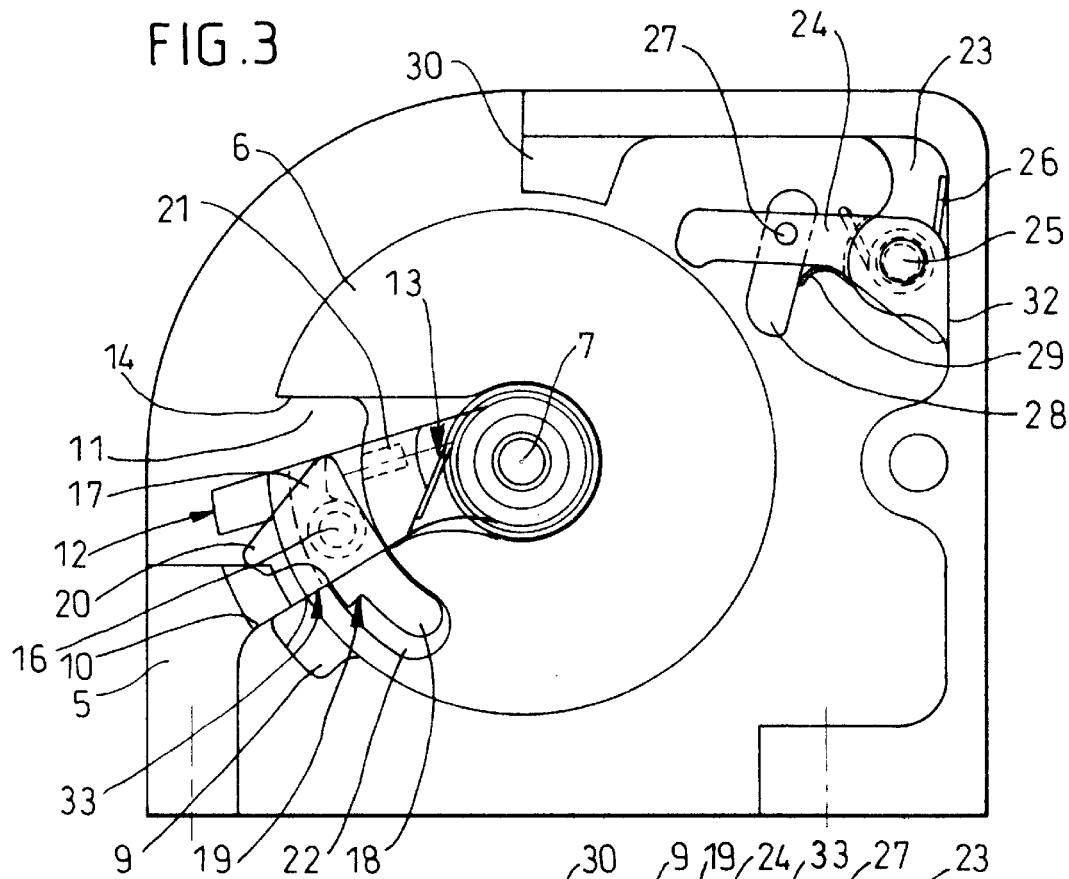
Figure 4:
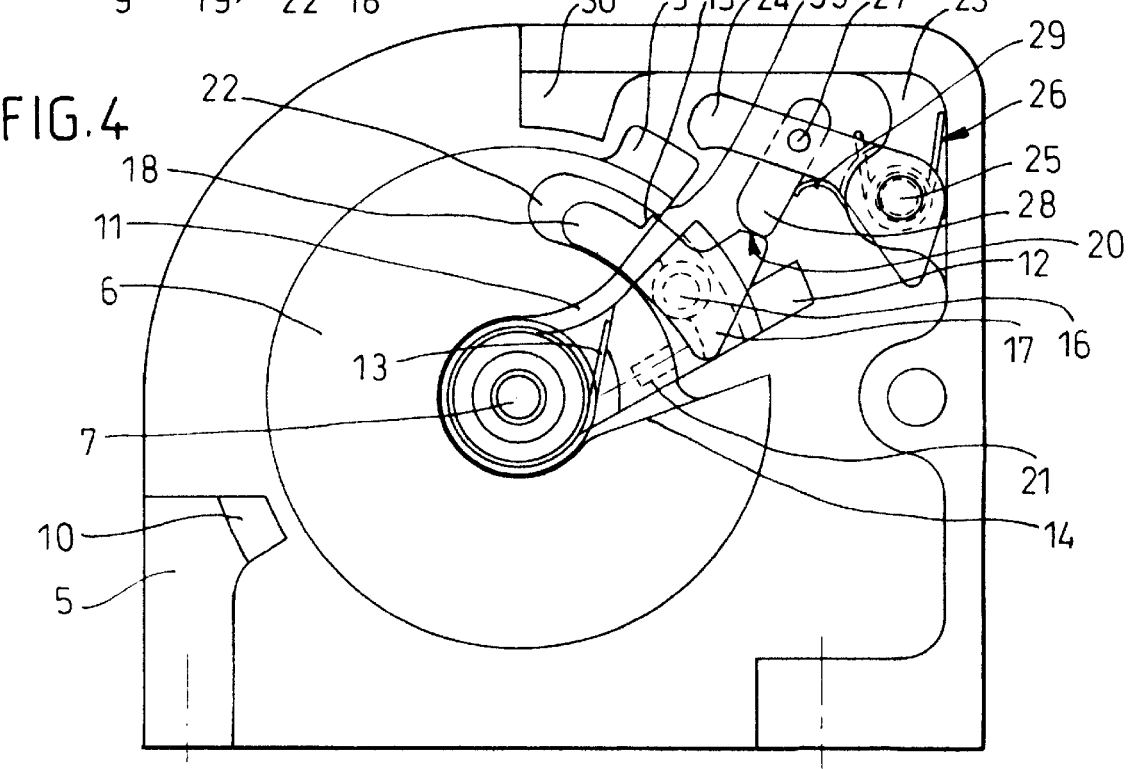
Figure 5:
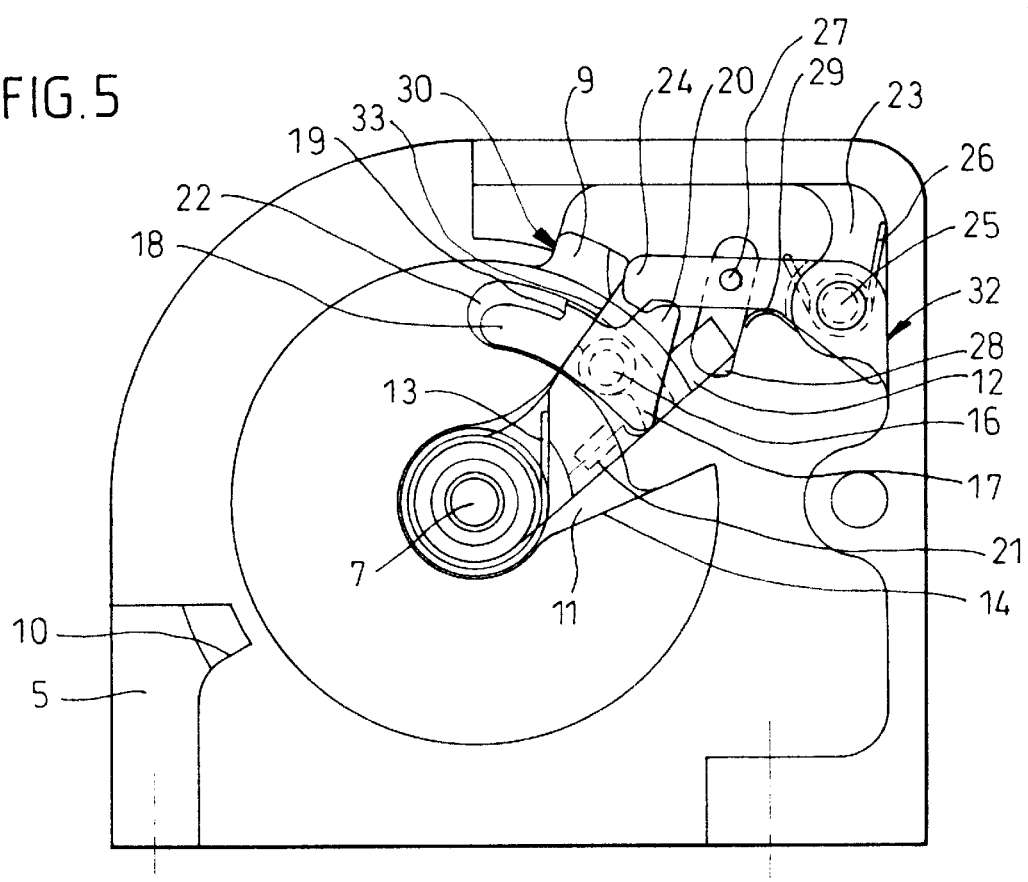
Figure 6:
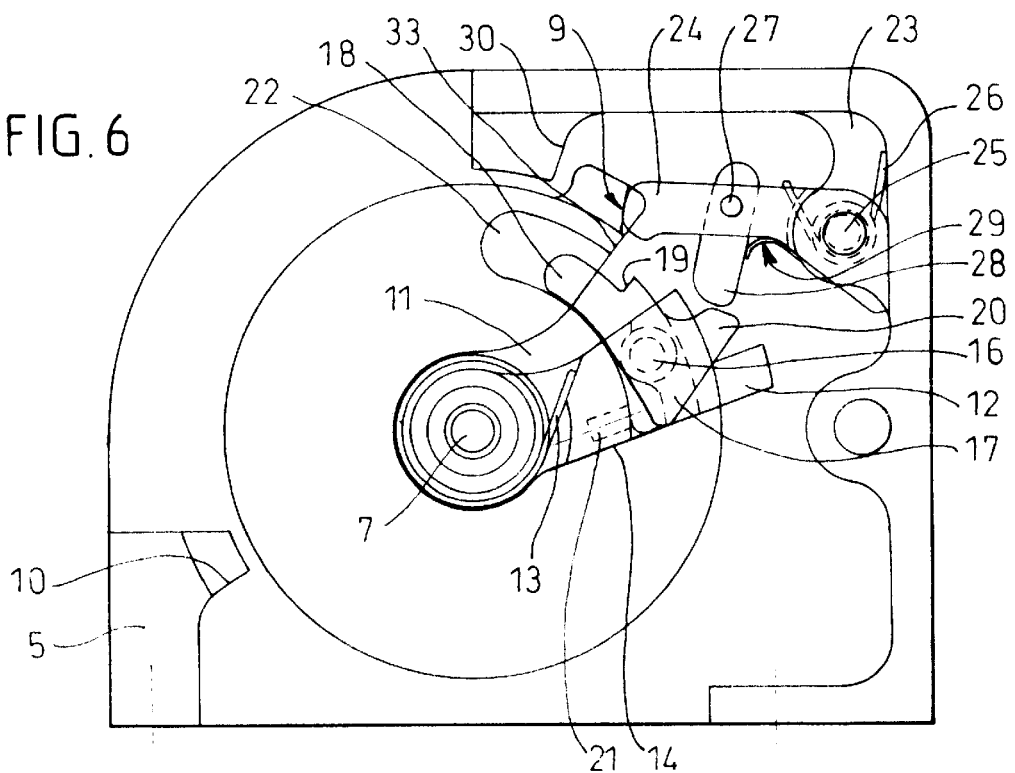
Figure 7:
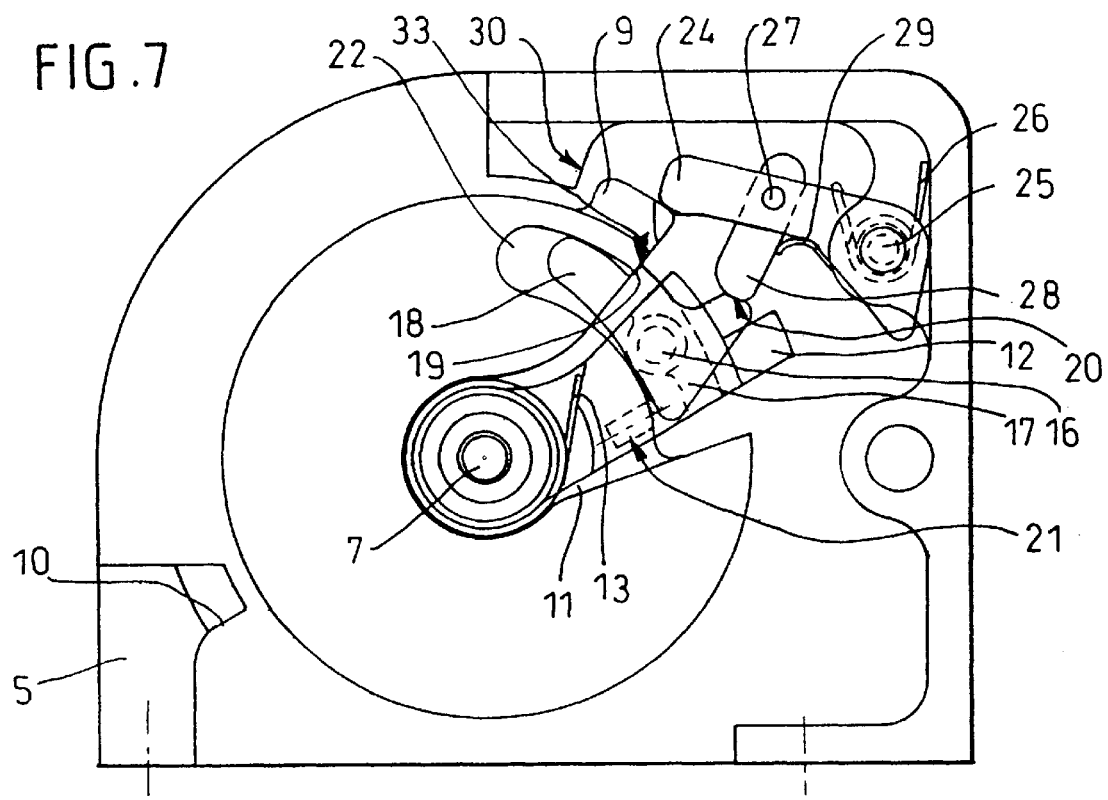
Figure 8:
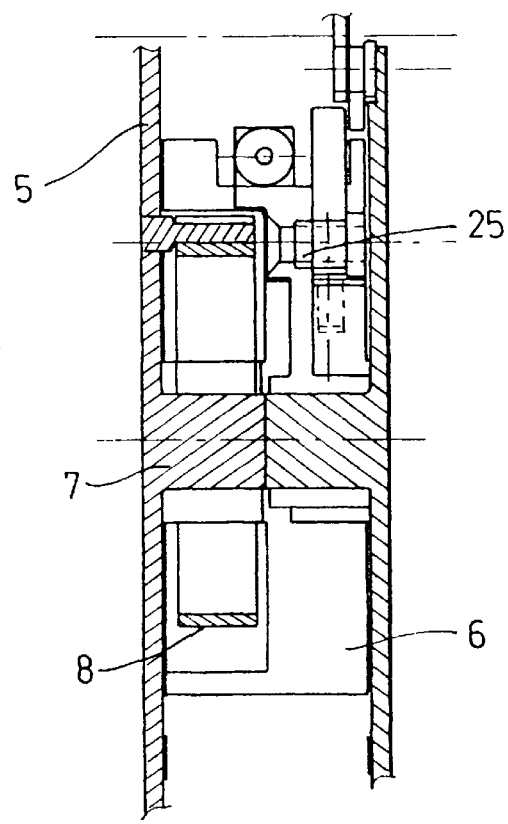
FIG. 8 is a vertical cutaway transverse view of the retraction device in its position on FIG. 6.

Under the effect of this traction, as shown on FIG. 3, the pivoting arm 12 is rotary-driven in an anticlockwise direction, thus compressing the spring 13 and comes to take support on the boss 31 of the drum 6. During this movement, the angle lever 17 is unopposed and remains in its position with respect to the pivoting arm 12 by virtue of the action of the small spring 21 so that the nose 19 of the angle lever 17 is engaged in the arc-shaped notch 22 of the drum 6 and then is no longer able to rotate during this first operating phase.

The first traction on the cable is continued (see FIG. 4) and the traction force on the cable 2 increases until the less stiff torsion spring 13 is compressed, the drum then being driven in rotation in an anticlockwise direction.

The boss 20 of the angle lever 17 then takes support on the secondary ratchet 28 which, no longer being able to rotate clockwise around the spindle 27, provokes a pivoting of the unit formed by the main ratchet 24 and the secondary ratchet 28 clockwise around the spindle 25. The traction on the cable 2 continues and the two ratchets 24, 28 are lifted up by compressing the return spring 26.

With the traction force on the cable continuing (FIG. 5), the drum 6 rotates until the first projection of its projecting portion 9 engages the stop 30 of the box 5, the cable 2 then being unwound to its maximum value. During this movement, the boss 20 of the angle lever 17 has gone past the secondary ratchet 28, the two ratchets 24, 28 being brought back to a low position by the spring 26 as far as the stop 32 on the box 5.

The traction force on the cable 2 ceases. The drum (FIG. 6) is driven in rotation in a clockwise direction by the highly stiff torsion spring 8 until a second projection consisting of a rear part of its projecting portion 9 abuts against the main ratchet 24. The pivoting arm 12 continues to rotate clockwise under the action of the spring 13 until the boss 14 of the drum 6 is engaged. During this movement, the boss 20 of the angle lever 17 makes the secondary ratchet 28 rotate anticlockwise and then goes beyond this ratchet 28 which returns to its position under the effect of the small spring 29.

The device is then in the reinforced position. The cable 2, for which a full traction has been able to be carried out, is fully unwound with nothing bringing it back and the operator is able to connect the electric connector 4 located at its extremity.

When releasing the load, the force for disconnecting the connector 4 provokes a traction on the cable 2 and (see FIG. 7) a rotation in an anticlockwise direction of the pivoting arm 12 and compression of the spring 13. During this movement, the boss 20 of the angle lever 17 is in opposition on the secondary ratchet 28. The small spring 21 is then compressed and the angle lever 17 pivots around the spindle 16, the spring 21 being much more flexible than the spring 26. The nose 19 of the angle lever 17 takes support on the stop 33 of the drum 6, thus preventing the pivoting arm 12 from reaching the boss 31 so that the main ratchet 24 remains lifted up and frees the projecting portion 9 of the drum 6.

Depending on the traction force exerted on the cable, which corresponds to the force for extracting the connector 4, two cases appear:

the force is slight (such as a connector with 19 pins) and has been deemed sufficient to partially compress the spring 13, separate the main ratchet 24 from the projecting portion 9 of the drum 6 and compress the spring 26. The unit shall not go beyond the position described above and then returns to its idle position (position shown on FIG. 2) by retracting the cable 2 and the connector 4 fixed to it;

the force is considerable and the drum rotates anticlockwise on a small additional angular sector until its projecting portion 9 engages the stop 30 of the box 5. The main ratchet 24 remains lifted up and the unit returns to its idle position.

It shall be observed that the force for dismantling the system is slight (mainly the compression of the spring 13) and that the retraction force is significant as provoked by the highly stiff torsion spring 8.

The above description has been merely given by way of nonrestrictive example and other constructive additions or modifications could be made without departing from the context of the invention.

What is claimed is:

1. A device for automatically retracting a connection member with a releasable or separable element, which comprises:

(a) a cable having one end fixed to said connection member, (b) a drum mounted to rotate about an axis and around which said cable is selectively wound and unwound, said drum being disposed within a casing, (c) a first spring mounted on said drum and rotatably urging said drum to a first end position in which a first projection on the drum engages a first stop on the casing, (d) a hollow part radially provided in said drum, (e) a lever pivoted about said drum axis and movable within said hollow part, said lever being fixed at a free end of said cable, (f) a second spring disposed around said drum axis and rotatably urging said lever to an end position engaging said drum, said first spring and said second spring exerting urging actions directed in a same direction, and the first spring being stronger than the second spring, (g) a stoppage device pivoted to said casing and urged by a holding member to pivot away from said drum against a return action of a third spring to allow, when a first traction force is applied to said cable for connecting said connection member, the drum to rotate to a second end position in which said first projection on the drum engages a second stop on the casing, the rotation of the drum from the first end position thereof to the second end position thereof being slightly less than one revolution, said drum being kept in the second end position thereof by said stoppage device engaging a second projection on said drum, and (h) said holding member being pivoted to said lever and engaging said stoppage device to cause said stoppage device to pivot away from said drum when said first traction force is applied to said cable, and when said drum is in the second end position thereof said holding member also urging said stoppage device to pivot away from said drum when a second traction force is applied to said cable by jettisoning a load to which said electric connection is connected, thus allowing said drum to return to said first end position thereof under the action of said first spring.

2. Device according to claim 1 wherein said stoppage device comprises a ratchet mounted on said casing to pivot between a first position in which said ratchet engages said second projection on the drum periphery to prevent rotation of the drum when in the second end position thereof, and a second position where the ratchet is removed from said second projection relative to said first position, allowing the drum to return to the first end position thereof under the action of said first spring.

3. Device according to claim 2 wherein said holding member consists of an angle lever having a first branch and a second branch remote from said first branch, said angle lever being movable between a first angular position in which said first branch fully engages a notch of the drum when said drum rotates from the first end position thereof to the second end position thereof thus placing said second branch in a position not engaging a secondary ratchet pivoted to said ratchet and a second angular position which differs from the first annular position in that said second branch engages said secondary ratchet and pivots said ratchet to the second position thereof.

4. Device according to claim 3 wherein a fourth spring is mounted on said angle lever to urge this angle lever to its first angular position thereof.

5. Device according to claim 3 wherein said first branch of the angle lever has a nose portion which, in the second angular position of said angle lever, engages a stop disposed on said drum near said notch, thus preventing said angle lever to pivot in a direction where said first branch engages said notch and keeping said second branch in a position thereof engaging said secondary ratchet to pivot said ratchet to the second position thereof.

6. Device according to claim 3 wherein a fifth spring mounted on said secondary ratchet urges said secondary ratchet to a position in which a portion of said secondary ratchet engages a stop mounted on said ratchet.

7. Device according to claim 6 wherein said ratchet is urged to the first position thereof by said third spring which exerts on said ratchet a return action greater than said urging action exerted by said fifth spring on said secondary ratchet.

8. Device according to claim 2 wherein the drum is housed with the casing, the ratchet is pivoted to an internal wall of said casing, and the second stop, which engages the second projection on the drum in the second position of the drum, is solid with an upper part of this internal wall relative to said ratchet, the first stop which engages the first projection on the drum in the first end position of the drum being solid with another internal wall of the casing.

9. Device according to claim 8 wherein, in the first end position of the drum, the cable is wound into the periphery of the drum over slightly less than one revolution.

* * * * *